United States Patent [19]
Filion et al.

[11] Patent Number: 5,952,630
[45] Date of Patent: Sep. 14, 1999

[54] ARMREST ELECTRICAL SWITCH ARRAY

[75] Inventors: Scott M. Filion, Newmarket; Bruce A. Batchelder, Lee, both of N.H.

[73] Assignee: Textron Automotive Company Inc., Troy, Mich.

[21] Appl. No.: 09/043,039

[22] PCT Filed: Sep. 11, 1996

[86] PCT No.: PCT/US96/14560

§ 371 Date: Jul. 24, 1998

§ 102(e) Date: Jul. 24, 1998

[87] PCT Pub. No.: WO97/11473

PCT Pub. Date: Mar. 27, 1997

[51] Int. Cl.⁶ .............................. H01H 9/00; A47C 7/54
[52] U.S. Cl. .................. 200/5 R; 200/52 R; 200/302.1; 200/308; 307/10.1; 296/153; 297/411.21; 338/99
[58] Field of Search .................. 200/52 R, 5 R, 200/5 A, 86 R, 61.54, 61.55, 61.57, 302.1–302.3, 308–317, 512–517; 296/153; 297/411.2, 411.21; 338/2, 4, 5, 47, 99, 114, 128.168; 73/862.041, 862.045, 862.625, 862.627, 862.68, 862.38; 307/10.1

[56] References Cited

U.S. PATENT DOCUMENTS

| | | | |
|---|---|---|---|
| 4,612,425 | 9/1986 | Kanai et al. | 200/61.55 |
| 4,742,192 | 5/1988 | Levine et al. | 200/61.57 |
| 4,975,547 | 12/1990 | Nakayama et al. | 200/5 R |
| 5,086,652 | 2/1992 | Kropp | 73/862.38 |
| 5,222,399 | 6/1993 | Kropp | 73/862.38 |
| 5,269,559 | 12/1993 | Filion et al. | 200/61.54 |
| 5,398,962 | 3/1995 | Kropp | 200/61.54 |
| 5,448,028 | 9/1995 | Filion et al. | 200/52 R |
| 5,463,258 | 10/1995 | Filion et al. | 200/61.54 X |

*Primary Examiner*—J. R. Scott
*Attorney, Agent, or Firm*—Reising, Ethington, Barnes, Kisselle, Learman & McCulloch P.C.

[57] ABSTRACT

A vehicle interior trim panel electrical switch assembly (10) includes a switch panel portion (16) with a continuous outer surface (18). Force sensitive resistor switches (20a–20g) are supported on the switch panel portion (16) and are secured to the inner surface of a skin cover having a continuous outer surface (18) and forming the outer layer of a soft feel composite. The force sensitive resistor switches are embedded in the soft feel composite either as being cast in a layer of flexible foam or being applied within preformed openings in a layer of flexible foam in certain embodiments in which case they are associated with a circuit module (34) that negates preloading effects due to thermal expansion caused by changes in ambient conditions. In a preferred embodiment the correction occurs due to a circuit configuration that corrects for such preloading effects on a deflection rate basis. The circuit module (34) for each switch (20a–20g) may also include a relay in high power applications.

8 Claims, 2 Drawing Sheets

ARMREST ELECTRICAL SWITCH ARRAY

This nonprovisional application is the National Stage Application of International Application No. PCT/US96/14560, filed Sep. 11, 1996, now International Publication No. WO 97/11473.

TECHNICAL FIELD

This invention relates generally to electrical switches incorporated into continuous trim panel surfaces and more particularly to such trim panels having a flexible outer skin; an intermediate layer of flexible foam and a relatively rigid substrate.

BACKGROUND OF THE INVENTION

Soft interior trim panels are currently used for vehicle interiors. These panels generally have an outer cover of leather, a plastic material that is similar to leather or a fabric material. A foam material on the back side of the outer cover provides the cover with a softer feel. A substrate is employed on the back side of the foam to support the foam and the outer cover and for mounting the soft interior trim panel in a vehicle. The outer cover or skin, foam backing and substrate in combination define a composite that is known as a soft feel composite.

Electrical switches are currently used in applications such as arm rests, console controls and the other interior trim components that are made of a soft feel composite. In some cases such electrical switches extend through an aperture in a bezel that passes through an aperture in a trim panel. Such electrical switches may either be secured to the bezel or attached to the same structure that the trim panel is attached to. These electrical switches and bezels are hard and rigid. The gaps and cracks formed between the bezels, switches, and a trim panel may catch on clothing and cleaning materials. The switches have crevices that are difficult or impossible to clean out, allow the passage of air and moisture and may transfer heat into or out of a vehicle passenger compartment. Furthermore, noticeable fit and finish problems can arise in such arrangement since it is difficult to always accurately fit a bezel around a switch component or switch array. An example of such arrangements is shown in U.S. Pat. No. 4,975,547.

Membrane switches may also be used in this type of application as is described in U.S. Pat. No. 5,448,028 issued Sep. 5, 1995 to Filion et al. Filion discloses a membrane switch supported by a trim panel beneath a layer of flexible skin. Other examples of multiple sheet membrane switches for interior applications are shown in U.S. Pat. Nos. 4,612,425 and 4,742,192. Such membrane switches are difficult to mold in place without introducing preload effects that can cause inadvertent accessory actuations. Moreover, membrane switches are "on-off" type switches that do not allow an occupant to vary the amount of electrical power flowing to the device that the switch controls.

U.S. Pat. No. 5,398,962 has a force-sensitive resistance sensor 30 having a low profile that is connected to the underside of a flexible outer cover and supported against a relatively rigid inner cover that overlies an air bag assembly. The sensor 30 is associated with a circuit that will compensate for thermal differences and includes a circuit that will provide a time delay before a given change in resistance will sound the horn. However, such an arrangement does not define a soft feel composite that is suitable for arm rest configurations or for protection against side impacts.

What is needed is an automotive interior door electrical switch array that is protected against fluid and dust contamination and is less disruptive of interior design contours such as smooth continuous trim panel surfaces and that will have a soft touch feel and also be able to compensate for changes in ambient conditions that might otherwise operate the switches. To accomplish this objective a conventional force-sensitive resistor sensor of the type shown in U.S. Pat. Nos. 5,222,399 and 5,086,652 is embedded in a soft feel substrate located in a side impact region of a vehicle wherein the soft feel substrate protects the switch mechanism. Furthermore, the switch mechanism is associated with a circuit that will prevent thermal expansion from adversely affecting the function of the array.

DESCRIPTION OF PREFERRED EMBODIMENTS

FIG. 1 shows a vehicle interior trim panel electrical switch assembly (10) of the type for actuating various vehicle electrical components comprises an interior trim panel (12) including a switch panel portion (16) having a continuous outer surface (18) and an electrical switch array (20) that is supported on the switch panel portion (16) of the interior trim panel (12). Characterizing the invention, the electrical switch array (20) is embedded in a soft feel substrate and the switch array (20) includes low profile force sensitive resistor sensors (30) that are protected by the soft feel substrate against side impact loading while operating electrical components such as power locks, power window lifts, power seat adjusters and power rear view mirror actuators through a wide range of ambient temperature conditions.

Unlike prior art door or console switch panels with mechanical switches or membrane switches the force sensitive resistor sensor (30) of the present invention is protected against fluid and dust contamination and can be molded in place without being disruptive of interior design contours such as smooth continuous trim panel surfaces while maintaining the operative characteristics of the switch. Furthermore, force sensitive resistor sensors have lower profiles than membrane switches and conventional mechanical switches and therefore take up less space in the trim panel (12) and can easily be incorporated into or under the continuous outer surface (18) of the switch panel portion (16). Furthermore, the embedding thereof in a protective soft feel substrate will protect them against side impact forces.

Incorporating the switch array (20) into a soft feel composite or under the continuous outer surface (18) enables the switching surface on an arm rest to be substantially flat to define a side arm rest surface adjacent vehicle passengers and wherein the side arm rest surface will provide a comfortable plush feel arm resting surface without impairing the operation of the switch array. More particularly, the use of force sensitive resistor sensors (30) provides a surface with continuous soft touch switching features and eliminates the need for a separate add-on bezel in mounting the switches Switches comprising force sensitive resistor sensors, or "touch" switches as they are commonly called, are also very light in weight compared to conventional mechanical switches. Therefore, they not only require less space in a trim panel (12), but are also less massive and are less of a factor in vehicle side impact collisions. Accordingly, they are less susceptable to damage in areas such as side door arm rest applications and thus can be operated following such impacts to open windows, adjusts seats or the like in order to assure easier egress from the vehicle following an accident.

BRIEF DESCRIPTION OF THE DRAWINGS

To better understand and appreciate the invention, refer to the following detailed description in connection with the accompanying drawings.

DETAILED DESCRIPTION OF THE PREFERRED EMBODIMENT

Figure 1:
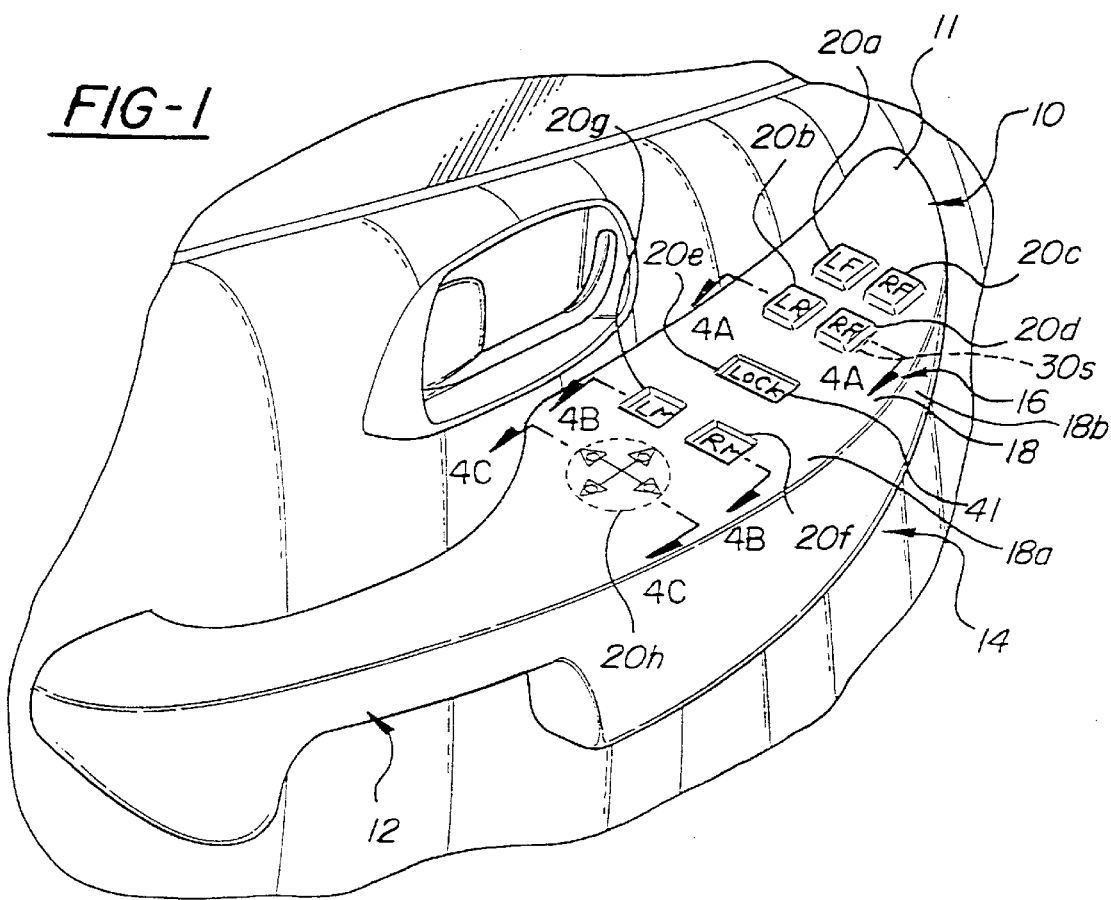
FIG. 1 is a perspective view of a vehicle armrest switch panel constructed according to the present invention.

A vehicle interior trim panel electrical switch assembly of the type for actuating various vehicle electrical components is shown at 10 in FIG. 1 as an arm rest 12 for a vehicle door 14. The arm rest 12 is formed as a soft feel composite 15, shown in section in FIG. 2, that includes a switch panel portion 16 that has a continuous outer surface 18 covering a switch array 20 including eight electrical switches 20a–20h. Four of the eight electrical switches are for opening and closing windows, one of the switches is for locking and unlocking doors, two are for selecting either the left or the right side view mirror for adjustment, and one multiposition switch is for adjusting the position of whichever side view mirror is selected by the two switches just described.

The arm rest 12 is shown as a separate member from the vertical door panel 14, but the arm rest and vertical door panel 14 could be formed as one integral interior panel. Furthermore, the vehicle interior trim panel electrical switch assembly 10 can be employed on any interior surface of a vehicle. It can be part of the dash and instrument panel, part of a headliner and overhead console between seats or any other part of a vehicle interior.

Additionally, the switch array 20 can vary in number and location. For example, in another application a single switch can be provided to operate an overhead light; a power operated sun roof or other electrically switched accessory on a motor vehicle. Other arrangements will depend upon the system being controlled by the switch array underlying a switch panel portion.

The soft feel composite 15 and switch panel portion 16 of the interior trim panel electrical switch assembly 10 comprises a substrate 22, a foam layer 24 bonded directly to the substrate and a flexible skin 26 with an underside surface 28 bonded directly to the foam layer. The switch panel portion 16 may be formed from any of a number of well known materials and by any one of a number of methods to include the methods and materials described in U.S. Pat. Nos. 5,448,028; 5,340,149 and 5,280,947, assigned to the assignee of the present invention, and incorporated herein by reference.

A variable resistance sensor 30 is supported on the switch panel portion of the interior trim panel. In accordance with the present invention, the sensor 30 is a force sensitive resistor sensor having a low profile that allows it to be easily incorporated into or under the continuous surface of the switch panel portion 16 which adds to the comfort and plush feel of the vehicle interior.

Figure 2:
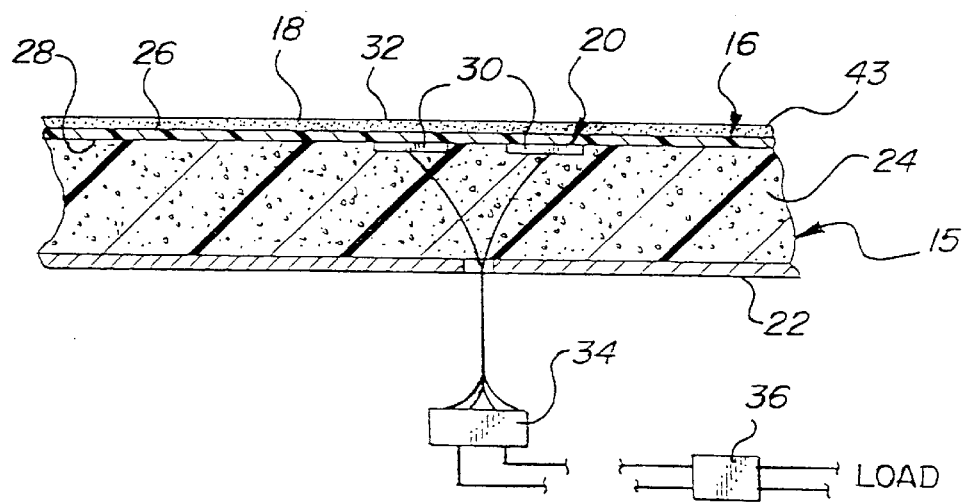
FIG. 2 is a cross sectional side view of a portion of the switch panel of FIG. 1 showing one alternative switch sensor installation according to the present invention.

The use of a force sensitive resistor sensor 30 in the embodiment shown in FIG. 2 provides a smooth surface region 32 that has no bumps or ridges and thus provides a continuous soft touch switching capability. It eliminates need for a bezel in mounting the switch as shown in prior art arrangements such as shown in U.S. Pat. No. 4,975,547. Also, it eliminates raised surface features such as disclosed in the aforesaid '028 patent. Furthermore, it eliminates the need for multiple sheet membrane switches for interior applications as shown in U.S. Pat. Nos. 4,612,425 and 4,742,192 and can provide a switching function in association with an associated circuit or electronic control module 34 that can provide an on-off function that is not subject to thermal expansion differences.

Figure 5:
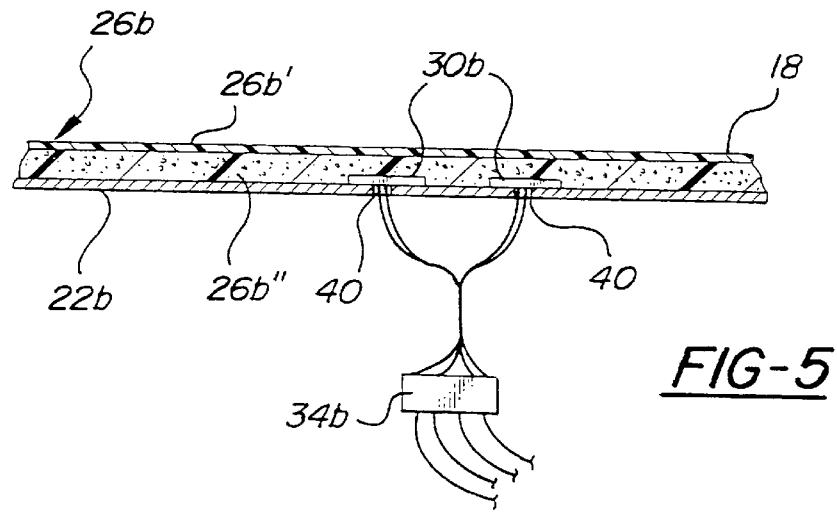
FIG. 5 is a cross-sectional side view of a switch panel showing a third alternative switch sensor installation according to the present invention.

Force sensitive resistor sensors 30 and associated circuit or electronic control modules 34 are light in weight and thin in profile compared to conventional mechanical switches. Therefore, they require less space in a trim panel and are less effected by side impacts when embedded in a soft feel composite. As best seen in FIGS. 2 and 5 each of the low-profile force sensitive variable electrical resistance sensors (30) (30b) are disposed beneath the continuous outer surface (18) of a switch panel portion (16). The outer surface (18) has a top surface portion (18a) and a side surface portion (18b). The side surface portion (18b) is located so as to be side impacted by an occupant if there is a vehicle crash. As shown, each of said plurality of low-profile force sensitive variable resistance sensors (30) (30b) are separated from one another and from the side surface portion (18b) and are embedded in the foam layer (24) so as to protect each of the low-profile force sensitive variable resistance sensors (30) (30b) from side impacts. Furthermore, as shown in FIG. 1, the low-profile force sensitive variable resistance sensors (30) underlying have a side (30s) thereon located in facing relationship to the side surface portion (18b) and the foam layer 24 in which the sensors (30) are embedded will protect the low-profile force sensitive variable resistance sensors (30) from side impact forces.

The sensor 30, more particularly, is the type of thin profile unit that when flexed has a change of resistance $\Delta R$ that, when applied to an circuit or electronic controller module 34 during a time span $\Delta T$ will cause an electronic switch therein to open or close. A drift in resistance due to environment or manufacturing installation does not activate the circuit. The circuit effectively re-zeroes itself after a drift, since it operates only on $\Delta R$ over a time span $\Delta T$ as more specifically set forth in U.S. Pat. No. 5,398,962 which is incorporated herein by reference.

As described above, the force sensitive resistor sensor 30 is disposed beneath the continuous outer surface of the switch panel portion and is embedded in the soft feel composite 15 where it is protected against side impacts and the like. While being protected such embedding subjects the sensor 30 to changes in loading due to thermal expansion differences that occur during swings in ambient temperature. To avoid the affect of such preloading effects, the force sensitive resistor sensor 30 is associated with a module 34 that defines a "zeroing" circuit that negates preloading effects on a deflection rate basis. Such preloading effects are common particularly when a switch is molded in place. Therefore, the zeroing circuit allows the force sensitive resistor switch to be molded in place, if desired, without adversely affecting control operation. The zeroing circuit also negates long term dimensional changes such as result from thermal expansion. An example of such a zeroing circuit is set forth in the aforesaid U.S. Pat. No. 5,398,962.

The module 34 if desired can be directly coupled to a load such that the variable resistance can increase upon increased finger loading so as to allow occupants to vary the amount of electrical power flowing to the accessory controlled by the switch by varying the amount of finger pressure applied to the flexible skin overlying the switch so as to provide a variable speed window lift action since, if desired an associated electronic control module can be programmed to produce an output that will power an electric drive window lift motor to vary in speed in accordance with the level of resistance produced upon deflection of the sensor 30. By controlling the amount of electrical power, occupants can control, for example, the speed of power window movement.

In high current applications, a relay 36 may be employed to minimize the amount of current passing through the variable resistor switch as shown in the circuit diagram in FIG. 2 wherein the module 34 is connected through a relay 36 to a load.

The force sensitive resistor sensor 30 is molded in-place between the substrate and the skin as shown in FIG. 2. In-place molding may be accomplished by any one of a number of well-known methods including the method described in U.S. Pat. No. 5,448,028 and incorporated herein by reference.

The force sensitive sensor 30 may, alternatively, be embedded in the flexible skin. In other words, the switch is held in place as skin-casting material is cast around it as more particularly shown in U.S. Pat. No. 5,269,559 assigned to the assignee of the present invention and incorporated herein by reference.

Figure 3:
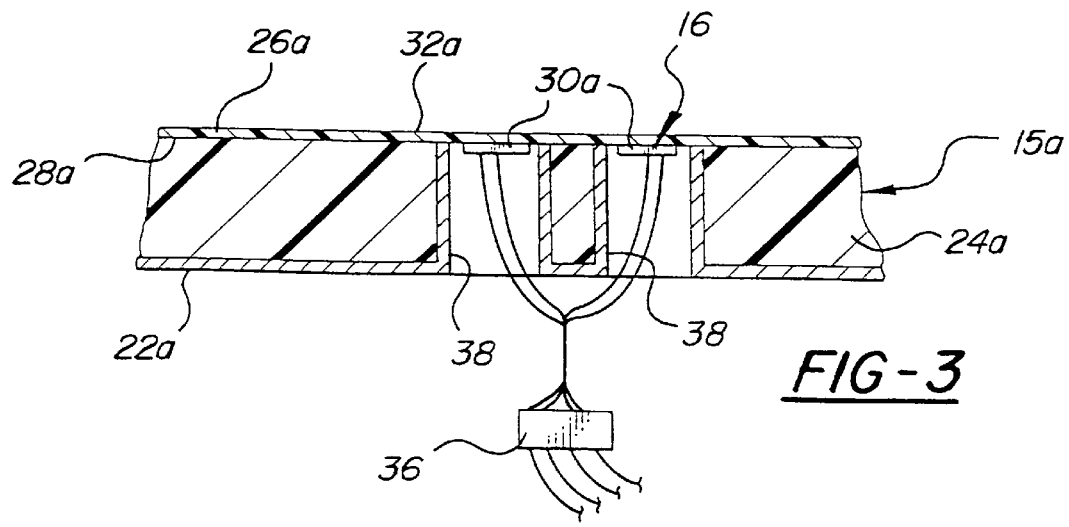
FIG. 3 is a cross sectional side view of a switch panel constructed according to a second alternative switch sensor installation according to the present invention.

The force sensitive resistor sensor may also be bonded, in a post-applied fashion, to the underside surface of the skin as shown in FIG. 3 at 30a. The underside surface of a flexible skin 26a on a soft feel composite 15a is made accessible via depressions 38 formed through the substrate 22a and foam layer 28a. In this embodiment a smooth surface region 32a can be provided.

In each embodiment shown in FIGS. 1, 2 and 3, many types of adhesives, including acrylics, urethanes, etc., may be used to bond the sensors to a trim panel's outer skin. The adhesives may be applied in any one of a number of forms to include pressure-sensitive backings and sprayed-on hot melts.

As another alternative, the outer skin can be vac-formed or cast and can be applied directly over the substrate by vacforming. In the embodiment in FIG. 5, the skin 26b is shown as a PVC layer 26b' with a cast PVC foam layer 26b". It is directly formed over a force sensitive resistor sensor 30b on a substrate 22b. The force sensitive resistor sensor 30b may be bonded to the retainer by being vac-formed in place as the skin is vac-formed over the substate 22b. In the embodiment of FIG. 5, the control wires go through pre-existing holes 40 in the substrate 22b and the sensors 30b are loaded in place. Then the skin 38 is vacuum formed over the entire surface of substrate 22b and mounted sensors 30b. In this embodiment the wires are shown connected to a module 34b.

In the various embodiments, the foam material can be molded in place, pre-molded arm can be any suitable foam material that will provide a desired backing, either a soft feel or, if desired, an energy absorbing characteristic as provided by the RIM materials disclosed in U.S. Pat. No. 5,232,957 also assigned to the assignee of the present invention and incorporated herein by reference.

Indicia 41 can be printed on an outside face surface of the flexible skin to indicate to occupants the function of each force sensitive resistor switch as shown in FIG. 1.

A transparent protective coating 43 may then be applied to the outside surface of the flexible skin and to the indicia. The coating is applied as a liquid and is then dried to form a thin durable protective film that keeps the indicia from rubbing off—as is described in greater detail in U.S. Pat. No. 5,448,028 and incorporated herein by reference.

Figure 4A:
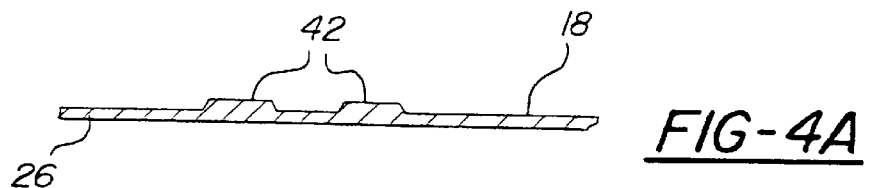
FIG. 4A is an enlarged cross sectional view of taken along the line 4A—4A in FIG. 1 looking in the direction of the arrows showing raised areas formed over switch sensors in the continuous outer surface of a switch panel constructed according to the invention.
Figure 4B:
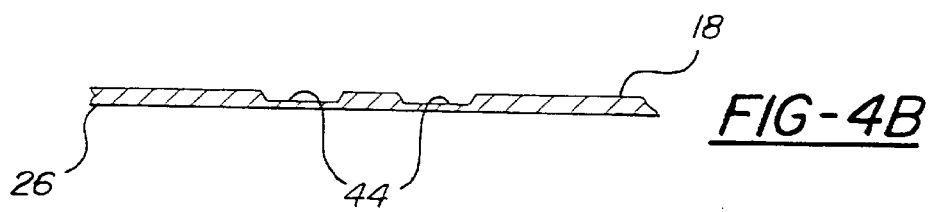
FIG. 4B is an enlarged cross sectional view taken along the line 4B—4B in FIG. 1 looking in the direction of the arrows showing depressed areas formed over switch sensors in the continuous outer surface of a switch panel constructed according to the present invention.
Figure 4C:
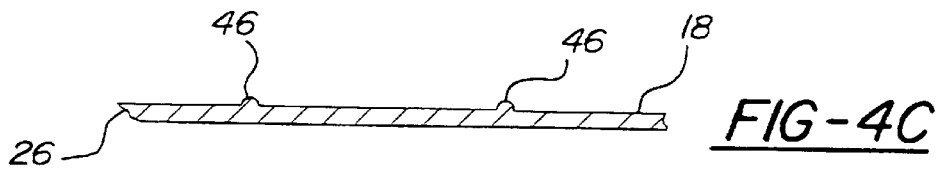
FIG. 4C is an enlarged cross sectional view taken along the line 4C—4C in FIG. 1 looking in the direction of the arrows showing raised areas formed around switch sensors in the continuous outer surface of a switch panel constructed according to the invention.

If desired, as shown in FIG. 4A at 42, a raised area may be formed in the flexible skin adjacent the force sensitive resistor sensor for guiding an occupant's finger tip to a location where the occupant may apply force to actuate the force sensitive resistor sensor. Alternatively, as shown in FIG. 4B at 44, a depressed area may be formed. Other types of surface discontinuities may be formed in the flexible skin as shown by raised nibs 46 in FIG. 4C for the same purpose and may be formed according to methods set forth in U.S. Pat. No. 5,448,028 and are incorporated herein by reference.

This is an illustrative description of the invention using words of description rather than of limitation.

Obviously, many modifications and variations of this invention are possible in light of the above teachings. Within the scope of the claims, where reference numerals are merely for convenience and are not limiting, one may practice the invention other than as described.

We claim:

1. A vehicle interior trim panel electrical switch assembly of the type for actuating various vehicle electrical components, said vehicle interior trim panel electrical switch assembly (10) comprising:

an a door arm rest (12) including a switch panel portion (16) having a continuous outer surface (18) including a flat, generally horizontally disposed upper surface portion (18a) and a generally vertically disposed side surface portion (18b); said upper surface portion (18a) configured as a side arm rest on a vehicle door and said side surface portion (18b) located in a position susceptible to side impact forces during vehicle crashes; said switch panel portion (16) of said interior trim panel (12) further comprising a substrate (22), a foam layer (24) bonded directly to said substrate (22) and a flexible skin (26) with an underside surface (28) bonded directly to said foam layer (24);

a plurality of low-profile force sensitive variable resistance resistor sensors (30) disposed beneath said continuous outer surface (18) of said switch panel portion (16) and embedded in said foam layer (24); each of said plurality of low-profile force sensitive variable resistance resistor sensors (30) separated from one another and from said side surface portion (18b); said foam layer (24) capturing each of said low profile force sensitive variable resistance resistor sensors; at least one of said low profile force sensitive variable resistance resistor sensors having a side portion (30s) thereon located in facing relationship to said side surface portion (18b) and said foam layer disposed there between for protecting said low profile force sensitive variable resistance resistor sensors (30) from vehicle crash side impact forces (18b).

2. A vehicle interior trim panel electrical switch assembly (10) as defined in claim 1 wherein said low profile force sensitive variable resistance resistor sensors (30) are attached to said underside surface (28) of said flexible skin (26).

3. A vehicle interior trim panel electrical switch assembly (10) as defined in claim 1 wherein said low profile force sensitive variable resistance resistor sensors (30) are attached to said substrate (22).

4. A vehicle interior trim panel electrical switch assembly (10) as defined in claim 1 further including indicia (41) printed on said continuous outer surface (18) in direct overlying relationship to each of said low profile force sensitive variable resistance resistor sensors.

5. A vehicle interior trim panel electrical switch assembly (10) as defined in claim 1 further including a depressed area (44) in said flexible skin (26) in direct overlying relationship to each of said low profile force sensitive variable resistance resistor sensors (30).

6. A vehicle interior trim panel electrical switch assembly (10) as defined in claim 1 further including a raised area (42) on said flexible skin (26) in direct overlying relationship to each of said low profile force sensitive variable resistance resistor sensors (30).

7. A vehicle interior trim panel electrical switch assembly (10) as defined in claim 1 including a control module (34) having a circuit that is connected to at least one of said low profile variable resistance resistor sensors and operative to produce a control output signal in response to a predetermined difference in resistance following a predetermined time delay following actuation of the electrical switch assembly.

8. A vehicle interior trim panel electrical switch assembly (10) as defined in claim 1 further including a relay connected to at least one of said low profile force sensitive variable resistance resistor sensors (30).

* * * * *